UNITED STATES PATENT OFFICE 2,650,914

METHOD OF IODINATING PROTEINS AND THEIR DERIVATIVES

William R. Graham, Jr., Wilmette, Ill., George O. Kohler, Mission, Kans., and Richard D. Hoover, Kansas City, Mo., assignors to American Dairies, Incorporated, Kansas City, Mo., a corporation of Maryland, and The Quaker Oats Company, Chicago, Ill., a corporation of New Jersey, jointly No Drawing. Original application October 13, 1947, Serial No. 779,644. Divided and this application June 4, 1951, Serial No. 229,874

2 Claims. (Cl. 260—119)

This invention relates to improvements in the method of iodinating proteins and their derivatives and refers more particularly to a method for incorporating into the proteinaceous substance a greater amount of the added iodine than is possible by conventional methods. The present application is a division of our copending application Serial No. 779,644, filed October 13, 1947, now Patent No. 2,586,425, issued February 19, 1952.

The iodination of protein is now usually performed by adding pulverized iodine or iodine in solution with potassium iodide or other vehicle to a solution or suspension of protein. The molecular iodine reacts with reactive or reaction responsive groups of the protein replacing reactive hydrogens to form iodinated amino acid plus hydrogen iodide in equimolecular proportions. The reaction is usually carried out commercially in an alkaline medium since the rate of reaction is many times increased than when performed in an acid medium. The hydrogen iodide (HI) reacts with the alkaline radical of the medium to form a metallic salt of iodine. Such method is costly since only about one-half of the iodine required for appropriate iodination of the protein is combined with the protein, the other half going to the alkaline vehicle to form sodium iodide (NaI), potassium iodide (KI) or other iodide salts.

The present invention can be applied either by using an oxidizing agent plus half the molecular iodine used in conventional procedures or by using an oxidizing agent plus an iodide salt.

The conventional reaction also presents difficulties which are inherent in the use of a volatile toxic corrosive molecular iodine. This element is difficult to handle and is impractical for use with certain types of mechanical equipment. It would be much more desirable to use the salts of iodine in such processes wherein molecular iodine is now used, thus eliminating solubility, grinding, corrosion, and other problems which are inherent to the iodine material.

An object, therefore, of the invention is to improve the utilization of molecular iodine in the iodination of proteins. Another object is to make possible the use of salts of iodine in the iodination of protein.

Other and further objects will appear from the description which follows.

It has been discovered that a substantially larger percentage of iodine will react with a protein solution or suspension when an oxidizing agent is present in the reaction mixture. It has also been determined that the reaction may be carried out by using the salts of iodine in the presence of an oxidizing agent. The reaction works equally well with either an iodine salt or molecular iodine and may be best described by Example I.

EXAMPLE I 94.85 gm. crude casein (90% purity) were dissolved in 4000 ml. of water containing 28.9 gm. sodium bicarbonate and 10.55 gm. potassium iodide at a temperature of 100° F. To this solution was added 24.0 gm. sodium-paratoluenesulfonchloramine. For convenience this substance will be referred to hereinafter and in the claims by its commonly used name, chloramine T. The solution was stirred for one hour at the temperature of 100° F. The solution was then acidified to pH 3.8 using hydrochloric acid (HCl) (diluted one part 36% HCl to six parts water). This caused the protein to precipitate. After allowing the precipitated protein to settle, the supernatant liquid was decanted. The curd was then squeezed in a cloth to remove more liquid. The pressed curd was then redissolved in dilute sodium hydroxide (NaOH) solution and reprecipitated by addition of hydrochloric acid (HCl) to pH 3.8. After decanting and pressing, the precipitated curd was redissolved and precipitated once again. The pressed, twice reprecipitated curd was then spread on a tray and dried at a temperature of 80° C. or approximately 175° F. for three hours. The dried curd was ground in a hammermill and sampled for analysis. The reprecipitations described above effectively removed inorganic iodide which might have remained after the reaction period. The preparation described was found to contain 7.71% iodine.

The amount of chloramine T used in this experiment (i. e. 24.0 gm.) was in excess of 33% over the amount theoretically required.

Results of experiments using other oxidizing agents in various amounts are shown in Table I below.

Table I

Iodination of Casein using KI plus Oxidizing Agents

| Example | Oxidizing Agent | Excess over Theoretical, Percent | Time of Reaction, Hours | Percent Iodine in Product |
|---|---|---|---|---|
| 1 | Chloramine T | 33 | 1:0 | 7.98 |
| 2 | $NaClO_3$ | 33 | 1:0 | 0.11 |
| 3 | $NaClO_4$ | 33 | 1:0 | 0.15 |
| 4 | $NaBO_3$ | 33 | 1:0 | 0.52 |
| 5 | NaOBr | 33 | 1:0 | 1.93 |
| 6 | NaOCl | 33 | 1:0 | 6.22 |
| 7 | NaOCl+air | a 33 | 16 | 6.41 |
| 8 | NaOCl+air | a 100 | 16 | 6.89 |
| 9 | Air ($O_2$) | a 0 | 16 | 1.30 |
| 10 | $KMnO_4$ | 33 | 4 | 3.33 |
| 11 | $KMnO_4$+air b | a 0 | 16 | 3.98 |
| 12 | $H_2O_2$ | 33 | 1 | 2.23 |
| 13 | $H_2O_2$+air b | a 50 | 16 | 4.56 | a The actual excess cannot be accurately calculated since air was bubbled through the solution for 12 to 15 hours. The percentages given refer to excess of oxidizing agent other than air.
b The oxidizing agent was added in a two-stage operation—see text.

It will be noted that there is a wide variation in the effectiveness of the oxidizing agents. This is due in part to the fact that some of the oxidizing agents used are effective in acid media only. This is particularly true of chlorates and perchlorates (items 2, 3, Table I). Another factor influencing the difference in effectiveness of the various agents is the rate of competitive side reactions for using up the oxidizing agents. To overcome competitive side reactions the conditions under which the reaction is carried out may be varied. Thus, for example, preparations were made using $H_2O_2$ and $KMnO_4$ as follows:

EXAMPLE II

Half of the $H_2O_2$ or $KMnO_4$ was added to the potassium iodide in acid solution. The mixture was added to the casein-$NaHCO_3$ solution. The remaining half of the $H_2O_2$ or $KMnO_4$ was then dripped into the solution (now containing partially iodinated casein, KI and $NaHCO_3$) over a four hour period. After bubbling air through the mixture for 12 more hours the dried precipitated casein contained more iodine than corresponding preparations made by the simple addition of $H_2O_2$ or $KMnO_4$ to the alkaline casein solution. In the case of $KMnO_4$ this procedure effects a saving in the amount of $KMnO_4$ required since it has a greater oxidizing capacity in the acid solution than in the alkaline solution.

A further important factor in determining the amount of iodide converted to iodoprotein is the amount of KI and oxidizing agent added to the protein as well as the ratio between them. We have found that the equivalent ratio of oxidizing agent to KI should lie in the range between 2:1 and 5:1 depending on the nature of the oxidizing agent and the conditions of the reaction in the terms of excess over the theoretical, this amounts to 9% to 250%. The amount of KI to be added depends on the nature of the protein and the degree of iodination desired.

EXAMPLE III

In order to have a product for comparison and determine the advantages afforded by the use of the oxidizing agents in the manner decribed, a preparation was made similar in every respect to that described in Example I except the oxidizing agent was omitted. The material produced in this manner contained 0.1% iodine on completion.

The effect of the nature or type of protein on the reaction is shown by the iodine content of preparations of iodocasein, iodozein and iodinated peanut protein prepared by an identical procedure. The oxidizing agent used was chloramine T plus air ($O_2$) over a sixteen-hour period. The iodine contents were 6.19%, 5.36% and 6.49% respectively. It will be seen from the examples given and the above discussion that many factors affect the reaction and various means can be used to improve its effectiveness. The objects of the invention have therefore been accomplished since a greater percent of added iodine has been incorporated into the protein, costs have been reduced and hazards of iodination have been eliminated. There has been provided a method of using iodides by the utilization of oxidizing agents as iodination reagents. It will also be seen that the invention is well adapted to attain the ends and objects hereinbefore set forth together with advantages which are obvious and inherent to the method.

It is to be understood that certain features are of utility and may be employed without reference to other features. This is contemplated by and is within the scope of the claims.

As many possible embodiments may be made of the invention without departing from the scope thereof it is to be understood that all matter herein set forth is to be interpreted as illustrative and not in a limiting sense.

Having thus described our invention, we claim:

1. A method of iodinating a proteinaceous material including the step of adding to the material an iodine bearing substance of the group consisting of molecular iodine and iodine salts in the presence of an oxidizing substance of the group consisting of alkali metal hypochlorite and alkaline earth metal hypochlorite.

2. A method of iodinating a proteinaceous material including the step of adding to the material an iodine bearing substance of the group consisting of molecular iodine and iodine salts in the presence of sodium hypochlorite.

WILLIAM R. GRAHAM, JR.
GEORGE O. KOHLER.
RICHARD D. HOOVER.

References Cited in the file of this patent

Likhosherstor et al.: J. Gen. Chem. (U. S. S. R.), vol. 4, pp. 622–628 (1934).

Harrington: J. Chem. Soc. (London), 1944, pp. 193–201.

Mellor: Comprehensive Treatise on Inorganic and Theoretical Chemistry, vol. 2, p. 255 (Longmans, Green and Co., 55 5th Ave. N. Y.).